United States Patent [19]

Marek

[11] Patent Number: 4,773,178
[45] Date of Patent: Sep. 27, 1988

[54] DEER DECOY

[76] Inventor: John Marek, Box 605, Cable, Wis. 54821

[21] Appl. No.: 74,725

[22] Filed: Jul. 17, 1987

[51] Int. Cl.$^4$ ............................................. A01M 31/06
[52] U.S. Cl. .................................................. 43/2; 43/1
[58] Field of Search ...................... 43/1, 2, 3; 446/475, 446/487, 221

[56] References Cited

U.S. PATENT DOCUMENTS

| | | | |
|---|---|---|---|
| 3,046,192 | 7/1962 | Bilyeu | 43/2 |
| 3,950,879 | 4/1976 | Kwako | 43/3 |
| 4,602,453 | 7/1986 | Polley | 43/42.06 |
| 4,609,245 | 9/1986 | Sakschek | 43/2 |
| 4,658,530 | 4/1987 | Ladehoff | 43/3 |

*Primary Examiner*—Kurt Rowan
*Attorney, Agent, or Firm*—Norman B. Rainer

[57] ABSTRACT

A portable apparatus is provided for hunters to be used to attract deer. The apparatus is comprised of an inflatable structure which, when inflated, has the contour and surface appearance of a deer. The inflated deer is anchored in a stable upright position by stakes which are driven into the ground through flaps attached to the feet of the deer. A scent dispenser is associated with the rear extremity of the deer, and dispenses an odor which attracts male deer.

2 Claims, 1 Drawing Sheet

DEER DECOY

BACKGROUND OF THE INVENTION

This invention concerns apparatus for attracting deer into close range of a hunter.

In certain hunting situations, particularly when the hunter is an archer, it is necessary that the hunter remain stationary in a concealed vantage point and that the target comes within close range of the vantage point. In the hunting of deer, the unpredictable wanderings of the animal make it unlikely that a deer will by chance approach within about 25 yards of the vantage point, namely the maximum effective range of the average bow hunter.

Although teams of hunters and packs of dogs can be used to comb an area of forest and drive any surrounded deer to a waiting hunter, such techniques require considerable effort, planning and expense. Techniques for luring or decoying deer have earlier been proposed, but such techniques have generally involved decoy devices of impractically large size or weight, or have been of limited effectiveness. For example, in heavily forested areas, decoy devices which rely solely upon visual attraction are not very effective.

It is accordingly an object of the present invention to provide apparatus for attracting deer into close proximity of a waiting hunter.

It is another object of this invention to provide apparatus as in the foregoing object of a readily portable nature.

It is a further object of the present invention to provide apparatus of the aforesaid characteristics capable of attracting a deer by visual appearance and by scent.

It is a still further object of this invention to provide apparatus of the aforesaid nature of rugged, durable construction amenable to low cost manufacture.

These objects and other objects and advantages of the invention will be apparent from the following description.

SUMMARY OF THE INVENTION

The above and other beneficial objects and advantages are accomplished in accordance with the present invention by apparatus comprising:

(a) an inflatable structure having the appearance of a deer, (b) anchoring means to enable the inflated structure to stand stably upright, (c) a scent dispenser removably associated with said inflatable structure, and (d) means for heating said dispenser.

In preferred embodiments, the inflatable structure is fabricated of thin flexible plastic sheet material, and is compartmented. Each compartment is capable of being orally inflated, and is equipped with a valve to facilitate inflation and deflation. The anchoring means are preferably associated with the feet of the inflated deer, permitting stakes to engage the feet and to be driven into the ground. Securement means may be associated with the head of the inflated deer to permit removeable attachment of antlers.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 3:
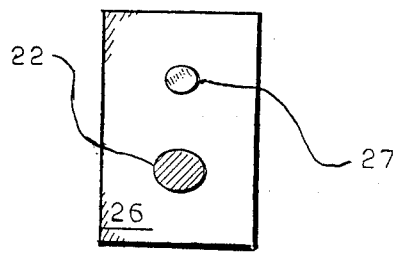
FIG. 3 is an enlarged sectional view taken along the line 3—3 of FIG. 1.
Figure 1:
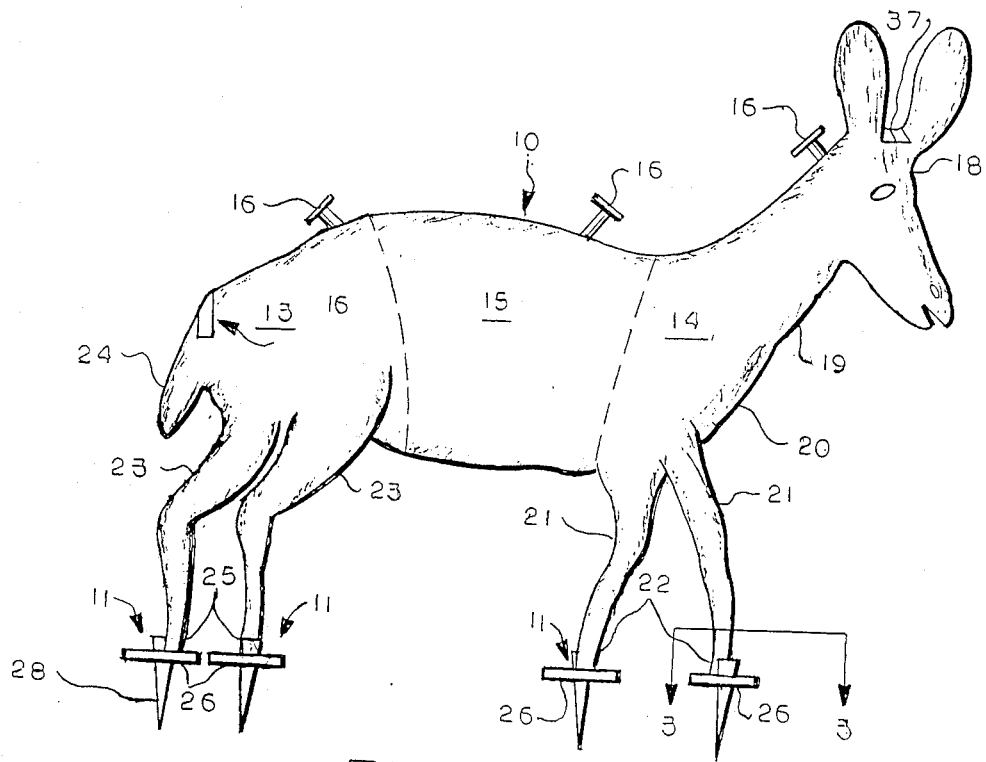
FIG. 1 is a side view of an embodiment of the apparatus of the present invention in its inflated state.

Referring to FIGS. 1 and 3, an embodiment of the hunting apparatus of the present invention is shown comprised of an inflatable structure 10 having the appearance of a deer, anchoring means 11 associated with the feet of the inflatable structure, and a scent dispenser 13 positioned upon the inflatable structure.

The exemplified embodiment of inflatable structure may be fabricated of flexible plastic sheet material having a thickness in the range of about 10–50 mils, or fiber-polymer composite sheet material of comparable thickness. Particularly suitable sheet materials are those, such as plasticized polyvinylchloride, which are heat-sealable. The exterior surface of the sheet material is properly ornamented so as to present a realistic visual appearance of a deer.

The inflatable structure is comprised of three separate air-tight compartments 14, 15, and 16, representing respectively the forward, middle and rearward portions of the structure. The compartments are capable of inflating to a turgid state either by oral inflation or inflation with a hand-operated pump such as used for bicycle tires. Regardless of the means of inflation, the compartments achieve a turgid state at pressures below 15 p.s.i. Each compartment is equipped with a valve device 16 of the type well known for use with inflatable plastic items, and adapted to permit either oral inflation, or inflation by a pump.

Forward compartment 14 includes features of the deer such as the head 18, neck 19, chest 20, legs 21 and front feet 22. Rearward compartment 16 includes the rear legs 23, tail 24, and rear feet 25. Each of the four feet is provided with anchoring means in the form of reinforced flat flap 26 adapted to lie upon the ground and having an aperture 27 therein through which a stake 28 may be driven. In order to achieve adequate stabilization of the anchored inflated deer, it has been found that flaps 26 should be directed away from the deer, causing the laterally opposed apertures and stakes to be somewhat further separated than the width of the deer. Apertures 27 are preferably lined with a metal grommet to protect against damage to the flap from the stake.

Figure 2:
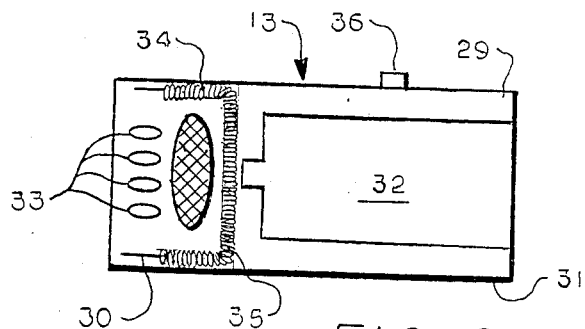
FIG. 2 is an enlarged sectional side view of the scent dispenser of the apparatus of FIG. 1.

Scent dispenser 13 is removably attached to the exterior of rearward compartment 16 adjacent tail 24. As shown more clearly in FIG. 2, the dispenser is comprised of outer casing 29 having a closure top 30 removably associated with lower chamber 31 adapted to confine batteries 32 and heating coil 35 operated by said batteries. The closure top is equipped with vent holes 33 which may be adjustably closed. An absorbent porous substrate 34 is disposed within said closure top adjacent heating coil 35. The function of substrate 34 is to hold a liquid scent composition in a state of high evaporative capability by virtue of the high evaporative surface of substrate 34. Said substrate may be comprised of a batting of fibrous material, or an opencelled sponge material. The liquid scent composition is intended to simulate the scent emitted by a doe deer in estrus, thereby serving as an attractant for a male deer. The effectiveness of the scent composition has been found to be enhanced when it is heated by the action of heating coil 35. An on-off switch 36 may be positioned upon the exterior of chamber 31 to control the usage of the batteries.

Securement means in the form of appendage loops 37 are provided in the head 18 to removably accommodate antlers. With antlers in place, the apparatus may serve to attract doe deers, and in certain seasons of the year may attract other male deer.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for attracting deer comprising:
   (a) an inflatable structure which, when inflated, has the appearance of a deer, said inflatable structure being fabricated of thin flexible plastic sheet material, and comprised of air-tight compartments, each capable of being orally inflated and equipped with a valve to facilitate inflation and deflation,
   (b) anchoring flaps to enable the inflated structure to stand stably upright, said flaps being associated with the four feet of the inflated deer and having apertures engagable by stakes which are driven into the ground upon which the inflated deer is positioned, said flaps being adapted to lie upon the ground and directed away from the deer, causing the laterally opposed apertures and stakes to be further separated than the width of the deer,
   (c) a scent dispenser removably attached to the exterior of the rearward portion of the deer adjacent its tail and containing an absorbent porous substrate which holds a liquid scent in a state of high evaporative capability, and
   (d) means for heating said dispenser.

2. The apparatus of claim 1 further provided with securement means associated with the head of the deer to removably accommodate antlers.

* * * * *